(12) United States Patent
Forkin

(10) Patent No.: US 8,840,860 B2
(45) Date of Patent: Sep. 23, 2014

(54) CONTAMINATION FREE COMPRESSION OF CORROSIVE GAS

(75) Inventor: Matthew Sakae Forkin, San Mateo, CA (US)

(73) Assignee: Meyer Intellectual Properties Limited (VG)

( * ) Notice: Subject to any disclaimer, the term of this patent is extended or adjusted under 35 U.S.C. 154(b) by 704 days.

(21) Appl. No.: 13/188,353

(22) Filed: Jul. 21, 2011

(65) Prior Publication Data

US 2012/0189525 A1 Jul. 26, 2012

Related U.S. Application Data

(60) Provisional application No. 61/367,627, filed on Jul. 26, 2010, provisional application No. 61/367,320, filed on Jul. 23, 2010.

(51) Int. Cl.
| | | |
|---|---|---|
| *C01B 33/08* | (2006.01) | |
| *B01J 19/18* | (2006.01) | |
| *B01J 19/00* | (2006.01) | |
| *B01J 8/10* | (2006.01) | |
| *C01B 33/107* | (2006.01) | |

(52) U.S. Cl.
CPC .. *B01J 8/10* (2013.01); *B01J 19/18* (2013.01); *B01J 2208/00212* (2013.01); *B01J 19/0073* (2013.01); *B01J 2208/0046* (2013.01); *B01J 2219/00094* (2013.01); *B01J 2219/00146* (2013.01); *C01B 33/10705* (2013.01)
USPC .......................................... 423/341; 423/342

(58) Field of Classification Search
USPC .................................. 423/341, 342, 344, 347
See application file for complete search history.

(56) References Cited

U.S. PATENT DOCUMENTS

| | | |
|---|---|---|
| 3,551,098 A | 12/1970 | Flemmert |
| 4,113,836 A | 9/1978 | O'Connor |
| 4,734,018 A | 3/1988 | Taniyama et al. |
| 6,189,176 B1 | 2/2001 | Ivey et al. |
| 2010/0150789 A1 | 6/2010 | Bhusarapu et al. |
| 2010/0150808 A1 | 6/2010 | Bhusarapu et al. |

*Primary Examiner* — Edward Johnson
(74) *Attorney, Agent, or Firm* — Edward S. Sherman

(57) ABSTRACT

A process for the synthesis of a high purity corrosive gas generated by decomposition of a precursor solid at high temperature deploys a dry vacuum pump and a compressor in series so that the corrosive gas is pressured as it fills storage containers.

13 Claims, 3 Drawing Sheets

CONTAMINATION FREE COMPRESSION OF CORROSIVE GAS

CROSS REFERENCE TO RELATED APPLICATIONS

The present application claims the benefit of priority to the US Provisional Patent application of the same title that was filed on Jul. 26, 2010, having application Ser. No. 61/367,627, and is incorporated herein by reference.

The present application also claims the benefit of priority to the US Provisional Patent application for a "Calcining Chamber and Process" that was filed on Jul. 23, 2010, having application Ser. No. 61/367,320, and is incorporated herein by reference.

BACKGROUND OF INVENTION

The present invention relates to the purification of corrosive gases generated by the decomposition of solid precursors and their concentration to a compressed form for storage and shipping without contamination.

Numerous chemical processes are used to produce high purity materials, and in particular contaminants free electronic grade materials, such as semiconductors, utilize highly reactive gas. One method of producing such high purity gases is by the calcining of a solid precursor in which the contaminants are rejected by either remaining as solids in the precursor or by phase segregation in the synthesis of the precursor.

Gases used to synthesize such materials are generally highly reactive, and hence can attack or corrode congenital hardware and equipment used in there production unless special precautions are taken in sealing the materials of construction of the equipment used to contain the synthetic process.

Accordingly, it is an object of the invention to provide a method and apparatus for removing such corrosive gases from a high temperature reactor, at low partial pressure for subsequent pressurization for storage at higher, above atmospheric pressure without an intervening step of cryo-condensation to a solid.

SUMMARY OF INVENTION

In the present invention, the first object is achieved by a process for providing pure silicon tetrafluoride, the process comprising introducing sodium fluorosilicate (SFS) in a reaction chamber, providing a first dry vacuum pump to evacuate the reaction chamber to less than about 200 torr, providing a compressor to receive the output of the vacuum pump, energizing the compressor, providing SiF4 gas to the seals of the dry vacuum pump, heating the SFS to at least about 700° C., energizing the dry vacuum pump to evacuate the chamber to less than about 200 torr, compressing the pure SiF4 formed in the reaction chamber to about 300 psi.

The above and other objects, effects, features, and advantages of the present invention will become more apparent from the following description of the embodiments thereof.

DETAILED DESCRIPTION

A particularly challenging problem is an efficient means to remove such gases from a reaction chamber and compress them for storage. Conventional vacuum pumps can be used, but must deploy a cryo-trap to condense the gas in front of the vacuum pump to prevent contamination of the product gas, as well as damage to the pump. This then requires a second process to warm up the condensed solid, to form a gas that can be compressed for storage in inert high pressure contains. The process is time consuming and inefficient and not well suited for continuous product processes.

One non limiting example of such a process is thermal decomposition of sodium fluorosilicate (SFS) to produce silicon tetrafluoride ($SiF_4$) which among other uses is, can be reacted with liquid sodium metal to produce Silicon metal. As silicon must be highly pure for use as a semiconductor in electronic and photovoltaic applications, it is of paramount importance that the $SiF_4$ is not only pure, but does not become contaminated by reaction with the process equipment. $SiF_4$ itself is toxic and highly corrosive. Further, it readily reacts with water to process hydrofluoric acid, which is more corrosive. At has recently been discovered that this process is most efficient and has a higher yield when the SFS powder is agitated and stirrer at pressure of about 50 to 200 torr. Hence, there is a need to collect the $SIF_4$ gas at such pressures.

A preferred use of the apparatus 100 below is to collect and compress $SiF_4$ gas that is formed by the thermal decomposition of dry SFS at or above 700° C. It C. It has been discovered that optimum pressure for such decomposition is generally from about 20 to 200 torr.

Figure 1:
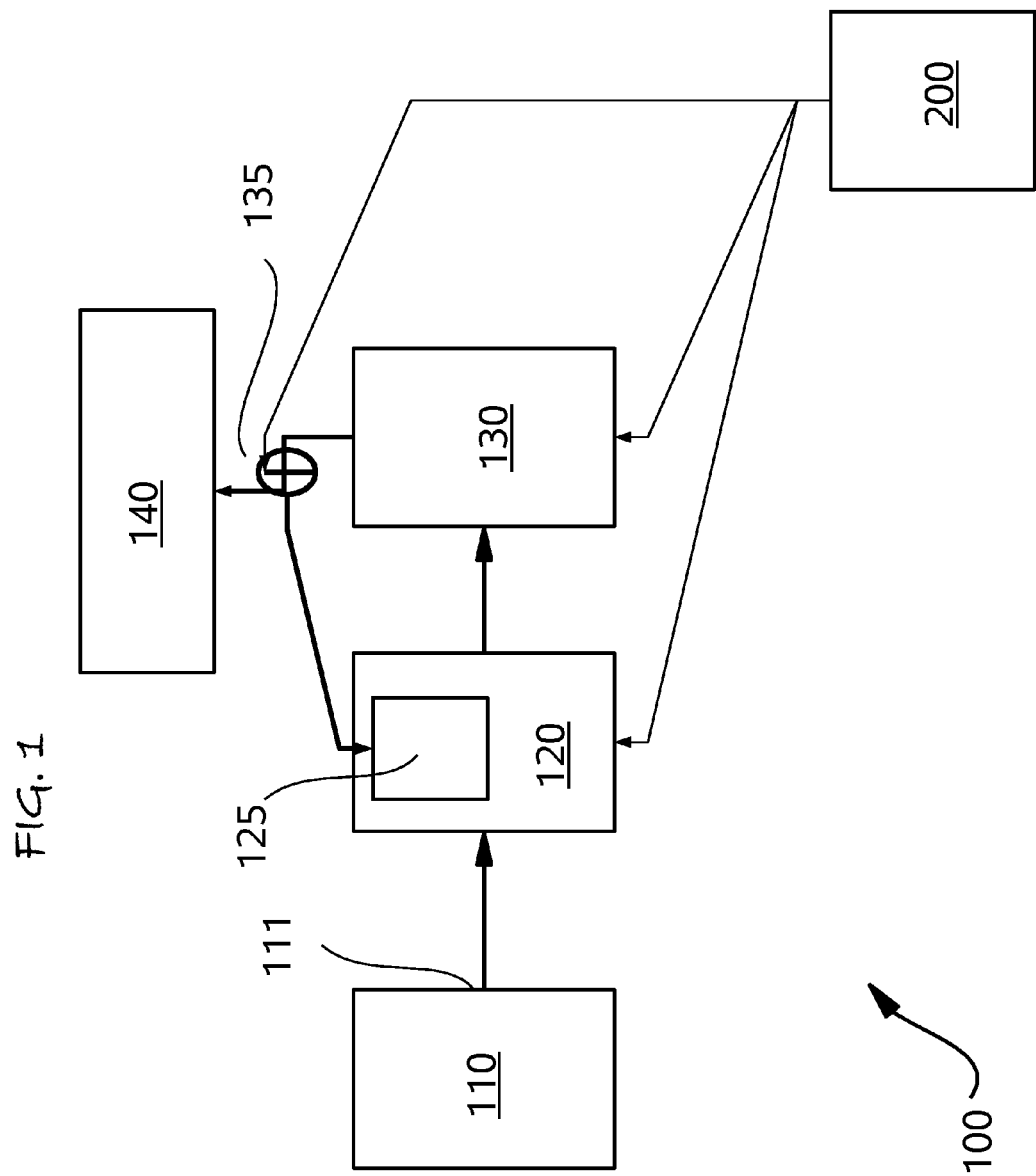
FIG. 1 is a schematic diagram of a first embodiment of the invention.
Figure 2:
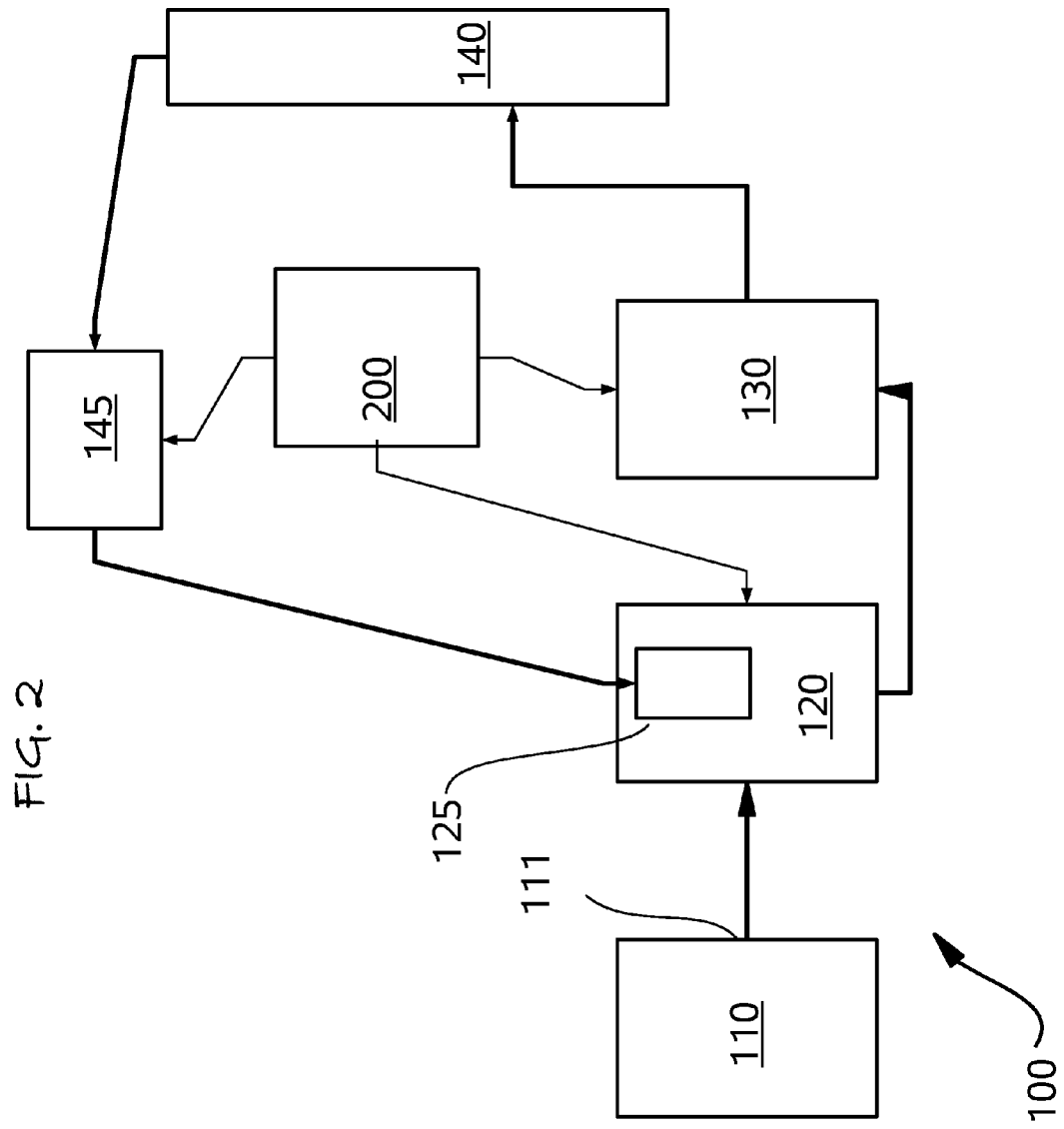
FIG. 2 is a schematic diagram of a second embodiment of the invention.

A decomposable solid, such as SFS, is introduced into a heatable chamber 110. The chamber 110 is evacuated, and then heated to the heat the solid to the decomposition temperature so that a pure gas is released. The gas is removed at an exhaust portal 111 by the action of a first dry vacuum pump 120 in communication therewith. This first vacuum pump 120 delivers the exhausted gas to a compressor 130, with compresses the gas into one or more storage tanks 140. To prevent contamination of the gas from seal region 125 of the vacuum pump 125, a small portion of the compressed gas is continuously bled off of the compressor 130 (as shown in FIG. 1) from the feed line to the tanks 140, and fed back to flush the seal regions 125 of the first vacuum pump 120. Alternatively, as shown in FIG. 2, the compressed gas in the storage tank 140 can be fed back to flush the seal region 145 of the first vacuum pump 120.

U.S. Pat. No. 4,734, 018, which is incorporated herein by reference, discloses one such dry vacuum pump that is generally suitable for use in the inventive apparatus and method. The pump deploys multiple a labyrinth seals between the bearings that support a rotary member that turns the pumps compressor shaft. The labyrinth seals thereof may be flushed with the bled of gas from the compressor as described above.

U.S. Pat. No. 6,189,176, which is incorporated herein by reference, discloses a high pressure glass cleaning purge of silicon oxide dust from a dry vacuum pump while installed on a crystal grower.

The dry vacuum pump and the compressor must not have any leaks that allow gas to leak in from the environments, as well as prevent the leakage of the pure gas formed from thermal decomposition out.

The portions of each pump apparatus that are exposed to the pure gas are constructed of materials that are substantially non-reactive therewith, thus avoiding contamination of the by-producers of such a reaction. Such materials include pure nickel for forming, cladding or coating metal components, and flouropolymers for resilient and flexible components.

In the start up phase when the compressor has not yet produced a sufficient quantity of pure gas to flush or purge the seal regions of the first vacuum pump, such pure gas can be provided from a storage tank.

Figure 3:
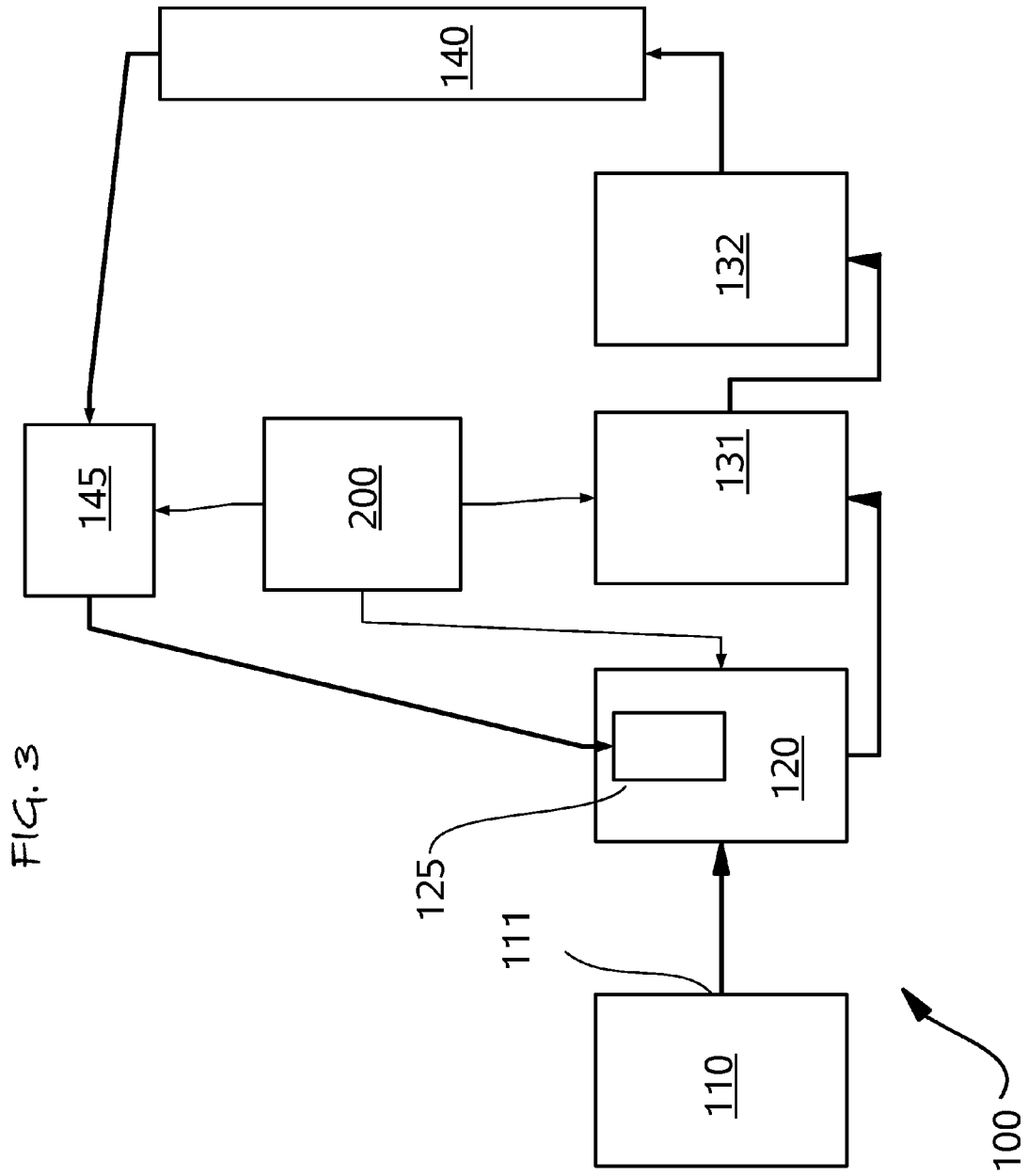
FIG. 3 is a schematic diagram of a third embodiment of the invention.

While the dry vacuum pump can evacuate to low pressure, the gas thus removed can only be compressed at the output port to few psi. Hence there was also a need for then deploying a compressor that receive the output of the dry vacuum pump at about 2 psig, and compressing it in a first stage to 60 psig, and in the second stage from about 60 psig to preferably at least about 300 psig for storage in tanks Further, it is also desirable that at least one particulate filter is deployed between the first dry vacuum pump and the compressor. FIG. 3 illustrates such an to apparatus 100 having a first compressor 131 connected to receive the output of the dry vacuum pump and a second compressor 132 connected thereto for another stage of compression beyond about 60 psig to preferably about 300 psig.

It is also preferred to deploy a control system that simultaneously maintains each pump at a speed to provide the optimum pressure for the other pump. In start up, the compressor starts first, then the dry vacuum pump after the optimum operating pressure is reached, and the vacuum pump seal region is fed with the compressed SiF4 gas. As shown in FIG. 1, control system 200 is also operative to modulate a valve 135 that controls the bleed of compressed gas from compressor 130 to the seal region 125 of pump 120. In contrast, in FIG. 2, controller 200 is operative to modulate a valve 145 that controls the flow of gas from tank 140 to the seal region 125 of pump 120.

The gas mixture that flushes the seal region is preferably either trapped with a cryo-pump or captured by reaction with a solid leaving a safely disposable residue or a material that can be returned to chamber for re-processing.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. An process for providing pure silicon tetrafluoride ($SiF_4$), the process comprising the steps of:
    a) introducing sodium fluorosilicate (SFS) in a reaction chamber,
    b) providing a first dry vacuum pump having a seal region to evacuate the reaction chamber to less than about 100 torr,
    c) providing a compressor to receive the output of the vacuum pump,
    d) energizing the compressor,
    e) providing $SiF_4$ gas to the seal region of the dry vacuum pump,
    f) heating the SFS to at least 700° C.,
    g) energizing the dry vacuum pump to evacuate the chamber to less than 200 torr,
    h) compressing the pure $SiF_4$ formed in the reaction chamber to at least 300 psi.

2. A process for obtaining a pure corrosive gas, the process comprising the steps of:
    a) providing a first reaction chamber having at least one outlet port,
    b) providing a first dry vacuum pump in fluid communication with the at least one outlet port to evacuate a corrosive gas from the reaction chamber,
    c) providing a compressor to receive the output of the vacuum pump,
    d) energizing the compressor,
    e) providing a pure form of the corrosive gas to the seals of the dry vacuum pump,
    f) initiating a reaction that produces the corrosive gas in the reaction chamber,
    g) energizing the dry vacuum pump to evacuate the chamber to remove the corrosive gas there from,
    h) compressing the corrosive gas that is received from the dry vacuum pump.

3. A process for obtaining a pure corrosive gas according to claim 2 further comprising the steps of filling one or more tanks with the pure compressed gas.

4. A process for obtaining a pure corrosive gas according to claim 2 wherein the pure form of the corrosive gas provided to the seals of the dry vacuum pump is obtained from a tank of the pure compressed gas.

5. A process for obtaining a pure corrosive gas according to claim 2 wherein the pure form of the corrosive gas provided to the seals of the dry vacuum pump is obtained from by bleeding the pure gas from a line connecting the output of the dry pump to the compressor.

6. A process for obtaining a pure corrosive gas according to claim 2 further comprising the step of introducing sodium fluorosilicate (SFS) to the reaction chamber and said step of initiating a reaction that produces the corrosive gas in the reaction chamber comprises heating the SFS to at least about 700° C. to produce $SiF_4$ as the pure corrosive gas.

7. A process for obtaining a pure corrosive gas according to claim 6 wherein said step of energizing the dry vacuum pump to evacuate the chamber to remove the $SiF_4$ comprises evacuating the reaction chamber to less than about 100 torr.

8. A process for obtaining a pure corrosive gas according to claim 7 wherein said step of compressing the corrosive gas that is received from the dry vacuum pump comprises compressing the pure $SiF_4$ formed in the reaction chamber to at least about 300 psi.

9. A process for obtaining a pure corrosive gas according to claim 7 wherein the pure $SiF_4$ formed in the reaction chamber is compressed in multiple stages.

10. A process for obtaining a pure corrosive gas according to claim 1 wherein portions of the pump exposed to the $SiF_4$ vapor are constructed of materials that are substantially non-reactive therewith.

11. A process for obtaining a pure corrosive gas according to claim 6 wherein portions of the pump exposed to the $SiF_4$ vapor are constructed of materials that are substantially non-reactive therewith.

12. A process for obtaining a pure corrosive gas according to claim 10 wherein portions of the pump exposed to the $SiF_4$ vapor are constructed of materials selected from the group consisting of pure nickel and flouropolymers.

13. A process for obtaining a pure corrosive gas according to claim 11 wherein portions of the pump exposed to the $SiF_4$ vapor are constructed of materials selected from the group consisting of pure nickel and flouropolymers.

* * * * *